No. 773,136. PATENTED OCT. 25, 1904.
D. FARRAND & P. C. OSCANYAN.
ELASTIC FLUID TURBINE.
APPLICATION FILED MAR. 10, 1903.
NO MODEL. 6 SHEETS—SHEET 3.

Fig. 3.

WITNESSES:
Geo. D. Richards
Geo. Douglass.

INVENTORS:
Dudley Farrand &
Paul C. Oscanyan
BY
Fred L. C. Fraentzel,
ATTORNEY No. 773,136.
PATENTED OCT. 25, 1904.
D. FARRAND & P. C. OSCANYAN.
ELASTIC FLUID TURBINE.
APPLICATION FILED MAR. 10, 1903.
NO MODEL.
6 SHEETS—SHEET 4.

WITNESSES:
Geo. D. Richards
Geo. Douglass.

INVENTORS:
Dudley Farrand &
Paul C. Oscanyan
BY Fred C. Fraentzel.
ATTORNEY No. 773,136. PATENTED OCT. 25, 1904.
D. FARRAND & P. C. OSCANYAN.
ELASTIC FLUID TURBINE.
APPLICATION FILED MAR. 10, 1903.

NO MODEL. 6 SHEETS—SHEET 6.

WITNESSES:
Geo. D. Richards
Geo. Douglass

INVENTORS:
Dudley Farrand &
Paul C. Oscanyan
BY
Fred'k C. Fraentzel,
ATTORNEY

No. 773,136.　　　　　　　　　　　　　　　　　　　　　　　　Patented October 25, 1904.

UNITED STATES PATENT OFFICE.

DUDLEY FARRAND, OF NEWARK, NEW JERSEY, AND PAUL C. OSCANYAN, OF NEW YORK, N. Y.

ELASTIC-FLUID TURBINE.

SPECIFICATION forming part of Letters Patent No. 773,136, dated October 25, 1904.

Application filed March 10, 1903. Serial No. 147,077. (No model.)

*To all whom it may concern:*

Be it known that we, DUDLEY FARRAND, residing at Newark, county of Essex, and State of New Jersey, and PAUL C. OSCANYAN, residing at New York, in the county of New York and State of New York, citizens of the United States, have invented certain new and useful Improvements in Elastic-Fluid Turbines; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference to improvements in turbines which are worked by elastic fluids—such as steam, gas, or the like; and our invention has reference more particularly to that class of turbines known in the art as "combined impact and reactive turbines."

The present invention has for its principal object to provide a simple construction of turbine having a comparatively low speed with a high efficiency and at the same time eliminating the objectionable features in turbines as heretofore constructed, especially in vertical types of turbines, in which the rotating element has been unbalanced against the pressure of the fluid, as steam, and its gravity—*i. e.*, the weight of the revolving element—being supported by a thrust-bearing, the friction therein adding to the inefficiency of the turbine. Furthermore, the efficiency of turbines of the vertical type necessarily depends upon the limited clearance between the stationary and rotating element, and on account of the construction and the arrangement of said elements the successful operation has depended upon the position of the shaft being accurately maintained, since the slightest axial movement of the shaft in either direction would result in the uselessness of the turbine and perhaps in the destruction of the same.

With a view of overcoming these objectionable and serious features now existing in turbines using elastic fluids it has been our purpose to provide a turbine with a revolving element or member which is balanced by the pressure of the fluid, as steam, and to provide a turbine in which the successful operation of said revolving vane member or element is not dependent upon the shaft maintaining a given position, so far as any axial movements are concerned.

For these reasons hereinabove stated and also for the following other reasons a greater efficiency of the working element or member of the turbine is claimed.

For the sake of a clear understanding we will briefly state that it is a fact in turbines having a single revolving element or member with one row of vanes or buckets that the peripheral speed of said vanes or buckets must be forty-five per cent. of the velocity of the fluid (steam) to produce the highest efficiency, which necessitates an axial speed of thirty thousand revolutions per minute in small units. To cut down this high speed, a multiple turbine of slow speed was designed in which the energy of the steam was absorbed in steps as the steam expanded through the turbine; but since the element or member rotates at a comparatively low speed as compared with the velocity of steam such turbines do not work at the highest efficiency. Furthermore, the multiple-element turbines as now constructed have elements or members which increase in diameter and consequent peripheral speed, thereby decreasing their efficiency in proportion to the decrease in the pressure of the fluid.

By means of the construction and novel arrangements and combinations of the parts, as hereinafter more fully set forth, of our novel turbine embodying the features of the present invention we have succeeded in eliminating all the said objectionable features above stated which now prevent high efficiency.

Our invention therefore consists in the novel construction of turbine, the operation of which is based upon the fact that the velocity of the fluid, as steam, is in proportion to its pressure and decreases as it expands.

The invention consists, furthermore, in the novel arrangements and combinations of the devices and their parts hereinafter more fully described and then embodied in the clauses of the claim which are appended to and form a part of this specification.

The invention is clearly illustrated in the accompanying drawings, in which—

Similar characters of reference are employed in all of the said hereinabove-described views to indicate corresponding parts.

Referring now more particularly to Figs. 1, 2, 3, 6, 7, and 8, the reference character 1 indicates the complete turbine, the same comprising a suitably-shaped shell or casing 2, closed upon the top by means of a cover or head 3 and at a suitable point within said shell or casing, so as to provide a chamber 4 with a bottom cover or head 5. These parts may be suitably connected, so as to provide steam-tight joints, the peripheral edge portion of the upper cover or head 3 resting upon an annular shoulder 6, provided with holes which correpond to oppositely-placed holes in the cover or head 3 and the parts being securely and tightly connected by means of the bolts 7 and nuts 8, substantially as illustrated. The said lower cover or head 5 is also provided near its peripheral edge portion with holes for the reception of bolts or screws 11, which are screwed into oppositely-located screw-sockets in an inner annular flange or shoulder 10 within the said shell or casing 2 and by means of which the said lower head 5 is fixed in position and provides the tightly-closed bottom of the chamber 4, as will be clearly understood. Of course it will be understood that the manner of securing these parts together is not essential and they may be connected in any other suitable and desired manner to provide tight joints. The lower annular portion 12 of the said casing or shell 2 rests upon a base 13, to which it is secured, preferably by means of screws or bolts 14, arranged in a perforated flange 15 of said part 12 of the shell. The upper head or cover 3 is made with a suitably-disposed exhaust portion or opening 16, over which is secured the end of an exhaust-pipe 17, and the lower head or cover 5 is also made with an exhaust port or opening 18, over which is secured an exhaust-pipe 19, leading through an open port 20 in the side of the lower annular portion 12, substantially as illustrated.

Figure 1:
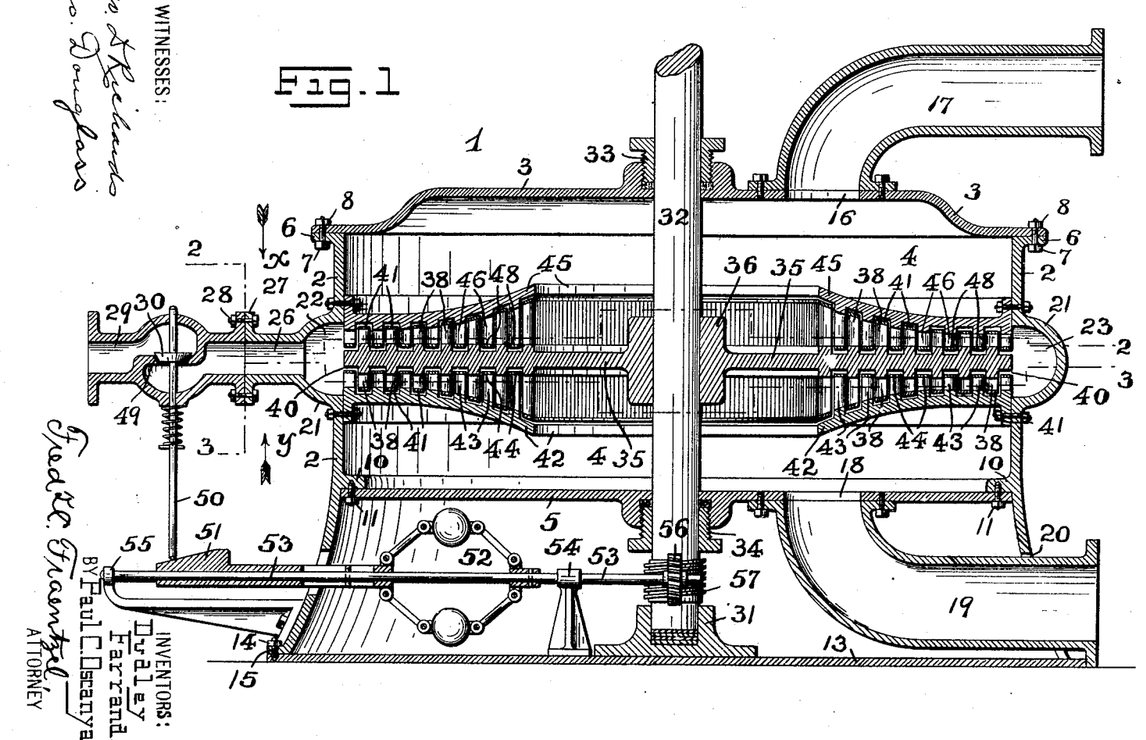
Figure 1 is a transverse vertical section of one form of turbine embodying the principles of this invention.
Figure 2:
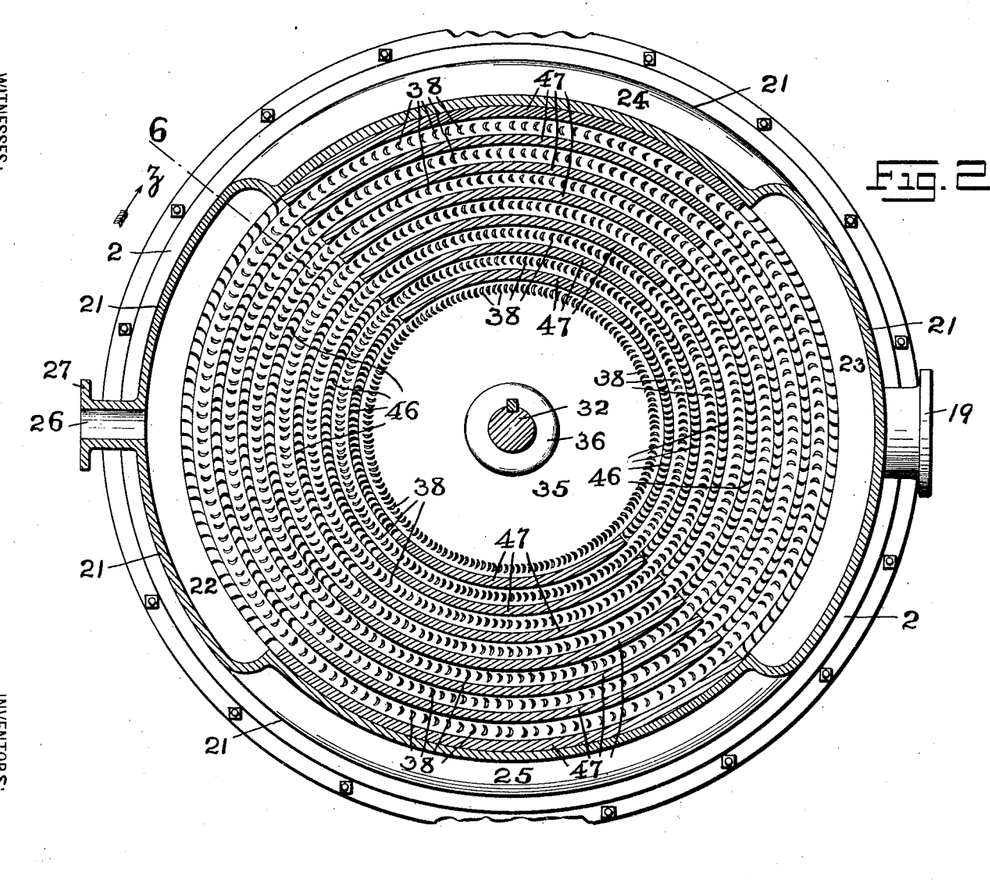
Fig. 2 is a horizontal sectional representation of the turbine, the said section being taken on line 2 2 in said Fig. 1 looking in the direction of the arrow $x$.
Figure 3:
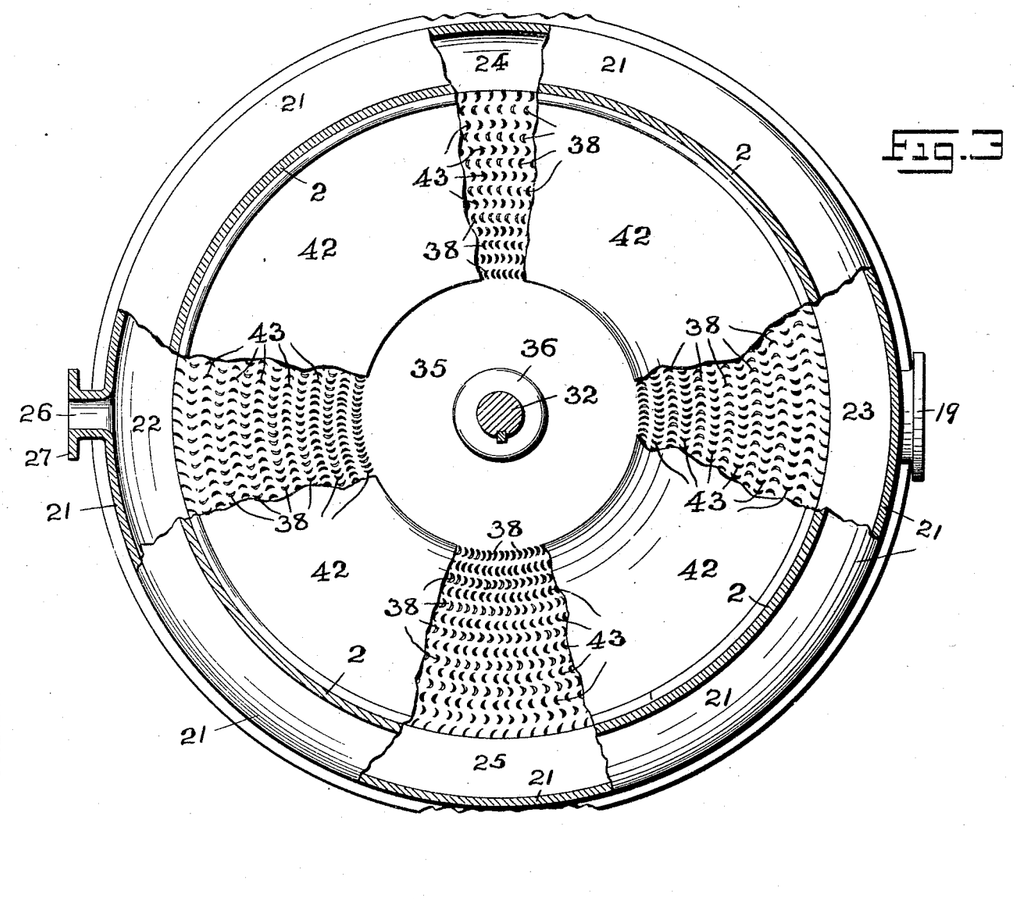
Fig. 3 is a similar section of the turbine, said section being taken on line 3 3 in said Fig. 1 looking in the direction of the arrow $y$, but certain parts of a lower stationary or fixed member carrying the stationary vanes or buckets being represented partly in plan and partly broken away.
Figure 5:
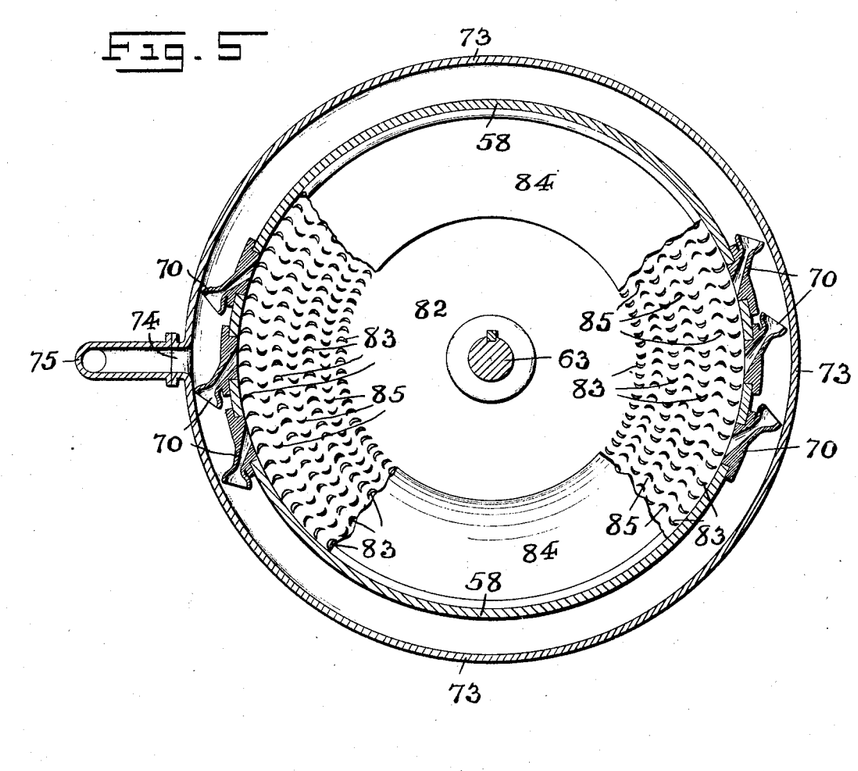
Fig. 5 is a horizontal sectional representation of the said turbine, said section being taken on line 5 5 in said Fig. 4 looking in the direction of the arrow $u$ and this form of turbine being designed to be operated by steam expanded adiabatically through nozzles to a nominal pressure but higher velocity.
Figures 6, 7, 8:
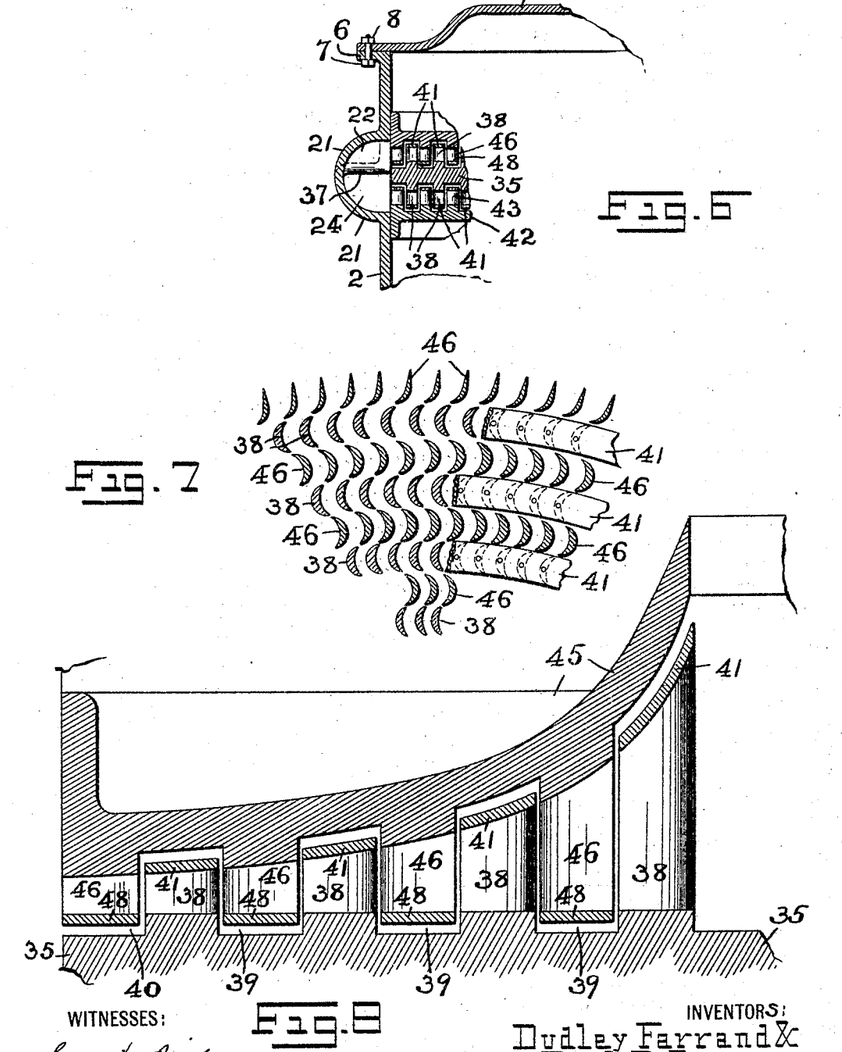
Fig. 6 is a detail transverse vertical section taken on line 6 6 in said Fig. 2 looking in the direction of the arrow $z$.
Fig. 7 is a diagrammatical representation of a number of concentrically-arranged fixed and movable vanes or buckets, on an enlarged scale, employed with our construction of turbine.
Fig. 8 is a detail transverse vertical section of a portion of the fixed member and a portion of the revolving member with their vanes or buckets, said view being made on a considerably enlarged scale to illustrate the manner of increasing the area of the vanes or buckets from the outer periphery toward the central shaft of the turbine, the said view also illustrating one manner of "shrouding" the vanes or buckets and the clearance between the shrouded parts of the vanes or buckets and the oppositely-located fixed and movable members, thereby providing for an axial movement of the shaft up or down without interfering with the successful workings of the movable vanes or buckets upon the revolving member between the stationary vanes or buckets upon the fixed member.

The said shell or casing is made with an enlarged portion 21, which surrounds the outer cylindrical surface of the shell or casing at a point preferably midway between the upper and lower heads 3 and 5, the said portion 21, as will be seen from an inspection of Figs. 1, 2, and 5, providing a chamber for the steam or other elastic fluid, the said chamber being in communication with the chamber, as illustrated, and on opposite sides of the casing or shell 2, as at 22 and 23, being semicircular in cross-section, each of the said semicircular chambered parts 22 and 23 preferably being a quadrant of a circle and the two oppositely-placed and remaining portions 24 and 25 of the said enlarged portion 21 of the shell or casing 2 being of quadrantal cross-sections, whereby at the points within the semicircular chambered parts 22 and 23 the elastic fluid, as steam, is admitted alike directly above and beneath the main movable or revolving member of the turbine, while at the points within the quadrantal chambered parts 24 and 25 the said fluid is admitted only on the one side of said movable or revolving member, as will be clearly understood and for the purposes to be presently more fully set forth. Connected with one of the said semicircular chambered parts, as 22, is an inlet member 26, preferably provided with an annular flange 27, to which is secured, by means of bolts 28 or in any other manner, a casing 29, which is provided with a valve 30. Rotatively arranged in a suitable pedestal-bearing, as 31, preferably secured upon the base 13, is a vertical shaft 32, which extends through stuffing-boxes 33 and 34, arranged, respectively, in the upper cover 3 and the lower cover 5, as clearly illustrated. Suitably secured upon said vertical shaft 32, by means of its hub 36, is a revolving or movable vane member 35, hereinabove mentioned, the said member being usually made in the form of a circular disk or plate having its marginal circular edge in close proximity and in alinement with the central open portions of said chambered parts 22 and 23, as illustrated in Fig. 1, and in close proximity and in alinement with the upper edge of the walls 37 of the quadrantal chambered parts 24 and 25, as represented in Fig. 6 of the drawings.

The said revolving member 25 is formed upon its opposite surfaces with pockets or vanes 38, arranged in desirable number of circular series or rows preferably concentric with the central axis of the vertical shaft 32, all with the spaces 39 between them and the marginal end spaces 40, so that the first circular series or row of vanes or pockets will be some distance in from the marginal circular edge of the said revolving member 25. These said vanes or pockets 38 are preferably made crescent shape in horizontal cross-section, and they are set at angles to their plane of rotation, all of which will be more clearly seen from an inspection of Fig. 7 of the drawings. The active surface areas of the various vanes or buckets 38 in the variously-placed circular rows, as will be seen from an inspection of the several figures of the drawings, increase from the outer series or row of vanes to the interior series or rows of vanes nearer the central vertical shaft, so that the outer circular series or row of vanes near the marginal edge of the said member 35 and which have the greatest peripheral speed will have the smallest surface areas, while the innermost circular series or row of vanes, which have the least speed, will have the largest surface area, the vanes arranged in the intermediate circular series or rows of vanes being graduated accordingly and all in proportion to and based upon the fact that the velocity of the entering steam is in proportion of its pressure and decreases as the steam expands. Thus the peripheral speed of the first set or row of moving vanes or buckets being equal to forty-seven per cent. of the velocity of the steam, which is their speed of highest efficiency, converts about eighty per cent. of the kinetic energy of the steam into mechanical power and the steam at the same time as it passes to the next rows or circular series of vanes expanding and increasing in area, thus resulting in a decrease in velocity. The remaining circular rows of vanes are thereby utilized in converting as much as possible of the remaining twenty per cent. of the energy of the steam into mechanical power, and a most efficient turbine is the result, since the peripheral speed of the next succeeding rows of vanes or buckets in the direction of the steam-passage toward the center of the turbine decreases with the velocity of the steam.

That the steam may exert all its force directly against the vanes, so that there will be no lost energy, each circular row or series of vanes is covered by means of a shroud 41, suitably secured upon the upper and free edges of the said vanes, and said shroud conforming to the configuration of the said edges. Now referring again to Fig. 1 of the drawings, the said shell or casing 2 has secured upon the inner cylindrical surface in any suitable manner a lower ring-shaped member 42, having a fixed or stationary position the desired distance beneath the said movable member 35. In cross-section this member is curved, preferably as illustrated in said Fig. 1, and it is provided with circular rows or series of stationary vanes 43, which extend into and are located directly in the spaces 39, between the moving vanes 38, and the outer row of said fixed vanes 43 being located directly in the space 40, as illustrated. The various rows of fixed or stationary vanes 43 are also made crescent shape in cross-section, but are of the reverse curvatures from those of the moving vanes 38, whereby the steam or other elastic fluid after acting by impact upon the first row of moving vanes reacts upon the next row of stationary vanes to exert its expanding force by impact against the next row of moving vanes, and so on until the steam leaves the innermost circular row of moving vanes. The outer row of stationary vanes, as will be seen from Fig. 7, is preferably provided with vanes of a parabolic cross-area, so as to more efficiently direct the steam against the first and outer row of moving vanes. The said fixed vanes 43 are also provided upon their free edges with a suitable shroud 44. The preferred arrangement of the alternate circular series or rows of movable and stationary vanes will be more clearly understood from an inspection of Fig. 8 of the drawings, from which it will be seen that the outer marginal edge portions of the moving vanes, directly opposite the roots of said vanes, are all of such curvature that radially the curve lying in the marginal surface portions of the said vanes from the central shaft to the outer row or series of vanes is a true parabola, while the marginal edge portions of the vanes 43 and 46, opposite the roots of said vanes, are all in straight alinement with one another and in the present instance lie within a horizontal plane. In this manner the various circular series or rows of movable vanes 38 and stationary vanes 43 are located within one another, forming receivers for receiving the full force of the elastic fluid, as steam, entering from all points of the chambered parts 22, 23, 24, and 25. In a like manner the said shell or casing 2 has secured upon its inner cylindrical surface in any suitable manner an upper ring-shaped member 45, having a fixed position the desired distance above the revolving or moving vane member 35. In its cross-section this member 45 is curved in an upward direction, preferably as shown, and it is provided opposite the chambered parts 22 and 23 with arc-shaped rows of vanes 46 and with the intermediately-arranged walls or partitions 47, as clearly illustrated in Fig. 2 of the drawings. Shrouds 48 are also preferably secured upon the upper free surfaces of the said vanes 46. It will thus be seen that a greater active surface upon the under portion of the revolving member 35 to provide more square inches of pressure upon the said under surface than upon the upper surface of said member 35 is the result, since upon the top the elastic fluid or steam enters only at two quadrants of the circular member 21, while at the bottom it enters throughout the entire circle, and the result is that the greater pressure in square inches upon the lower or under surface of the revolving member 35 counteracts the weight of the shaft and said member 35, and a perfectly-balanced and evenly-running turbine is the result. It will also be evident that with the present arrangement of moving and stationary vanes sufficient spaces may be left for clearance between the free edges of the vanes and the oppositely-located surfaces of the respective members 35, 42, and 45 to allow for sufficient expansion and to permit the shaft and said member 35 to move in either direction, either up or down, whereby the operative positions of the parts are accurately maintained. All of this will be clearly seen and understood from an inspection of Figs. 1 and 8 of the drawings.

In connection with the hereinabove-described turbine a governing device may be employed for controlling the relative positions of the valve 30 above its valve-seat 49. In its normal initial position this valve is open, it being provided with a downwardly-extending stem 50, which rests upon the higher part of the inclined surface of a revolving cam-shaped wedge 51, which is of an elliptical or oval cross-section. Thus no matter at what speed the turbine is running the valve-disk 30 will in quick succession become seated and then removed from the valve-seat 49, whereby the elastic fluid enters between the vanes in puffs, the distance that the valve is lifted from its seat being controlled by the varying speed of the governing device 52 to maintain a constant speed of the turbine. This governing device 52 revolves with a rod or shaft 53, to which it is secured, in a pair of bearings 54 and 55, the said shaft being driven from a worm-wheel 56, in mesh with a suitable worm 57 on the vertical shaft 32. Although the said cam-shaped wedge 51 revolves with said shaft or rod 53, it is also capable of a sliding movement upon said rod or shaft 53, due to the centrifugal action of the governing device 52, the said edge raising the vibrating valve 30 farther from its seat 49 during the slower speeds and not so far from its valve-seat during the faster speeds to maintain a constant and uniform speed of the member 35 and shaft 32 of the turbine. This governing device and the valve may be of any suitable and well-known constructions.

Figure 4:
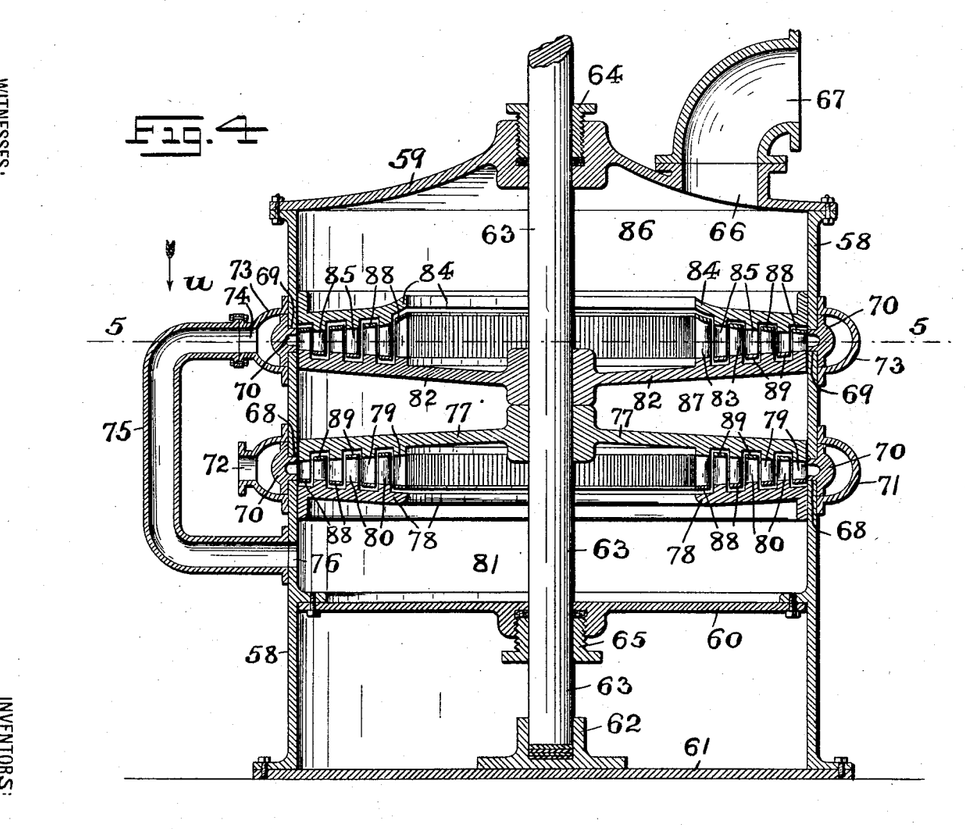
Fig. 4 is a transverse vertical section of a multiple-element turbine made according to the principles of our present invention.

In Figs. 4 and 5 we have represented a multiple-element turbine embodying the principal features of our present invention. In the said figures the reference character 58 indicates the main shell or casing, the same being provided with an upper cover 59 and a lower cover 60, which are secured to the said shell or casing 58 to provide a steam-tight joint or closure, preferably by the same means illustrated in the construction represented in said Fig. 1 of the drawings. The said shell or casing 58 is secured to a base 61, on which is a pedestal-bearing 62 for a vertical shaft 63, which is also rotatively arranged in stuffing-boxes 64 and 65 in the respective covers 59 and 60. The said cover 59 is formed with an exhaust-port 66, over which is arranged an outlet 67. In this construction the shell or casing 58 is made with two rows of suitably-disposed openings 68 and 69, in which are fitted the discharge ends of nozzles 70, through which the elastic fluid, as steam, is adiabatically expanded to a nominal pressure, but higher velocity. Inclosing the lower set of nozzles 70 is a semicircular or other suitably-shaped shell or casing 71, provided with an inlet 72 for the admission of the elastic fluid, as steam, into the chamber formed by said shell 71 and into the nozzles 70. The upper set of nozzles 70 are inclosed by a semicircular or other suitably-shaped shell or casing 73, provided with an inlet 74, which is connected, by means of a pipe or duct 75, with an opening or port 76 in the lower portion of the said casing or shell 58 at a point below the revolving vane member 77, affixed to the shaft 63, and a fixed or stationary vane member 78 directly beneath said member 77. Thus the fluid passing from the inlet 72 into the chambered casing 71 will enter the lower set of nozzles 70, whereby the elastic fluid is caused to act by impact against the vanes 79 on the vane member 77 and react against the stationary vanes 80 on the vane member 78, the steam being exhausted into the lower portion 81 of the shell or casing 58. The elastic fluid, as steam, thereupon enters the pipe or duct 75 and passes by means of the inlet 74 to the chambered shell 73, into the upper set of nozzles 70, and from said nozzles between the sets of movable vanes 83 on the moving vane member 83, also affixed to the shaft 63, and the sets of stationary vanes 85 on a fixed member 84, and the steam or other elastic fluid exhausting into the upper portion 86 of the shell or casing 58 and passing finally into the exhaust-pipe 67, all of which will be clearly understood from an inspection of the said Fig. 4 of the drawings. The action of the elastic fluid upon the vanes of the several members and the general arrangement and construction of the said vanes is similar to that of the vanes employed with the revolving member 35 and the fixed vane member 42 of the construction of turbine represented in Fig. 1 of the drawings. From an inspection of Fig. 4 it will be seen that the steam or other elastic fluid being exhausted into the chambered parts 81 and 86 of the casing or shell 58 the two movable vane disks or members 77 and 82 are perfectly balanced, a vacuum-chamber 87 being formed between the said vane members 77 and 82. The moving vanes or buckets, as well as the intermediately-arranged vanes or buckets in this form of turbine, are also preferably provided with shrouds 88 and 89, sufficient spaces being left between the oppositely-placed parts to permit for the expansion and axial movements of the vertical shaft 63 in an upward or downward direction, as will be clearly evident. From the herein-above description of our invention it will be clearly understood that we have devised a simply-constructed and efficiently-operating elastic-fluid turbine in which the parts are all perfectly balanced and with a low speed producing a high efficiency.

We are fully aware that changes may be made in the various arrangements and combinations of the devices and in the details of the construction of the parts thereof without departing from the scope of the present invention. Hence we do not limit our invention to the exact arrangements and combinations of the devices and their parts as described in the previous specification and as illustrated in the accompanying drawings, nor do we confine ourselves to the exact details of the construction of the said parts.

Having thus described our invention, what we claim is—

1. An elastic-fluid turbine, comprising, a casing, a series of movable and fixed vanes arranged in circular rows, the said vanes being located in rows within one another, the outer row of vanes being of a parabolic cross-section, and the remaining rows of vanes being crescent shape in cross-section, substantially as and for the purposes set forth.

2. An elastic-fluid turbine, comprising, a casing, a series of movable and fixed vanes, said vanes being arranged at angles to their plane of rotation, the outer row of vanes being of a parabolic cross-section, and the remaining rows of vanes being crescent shape in cross-section, substantially as and for the purposes set forth.

3. An elastic-fluid turbine, comprising, a casing, a series of movable and fixed vanes arranged in circular rows, the said vanes being located in rows within one another, and a shroud over each row of vanes, the outer row of vanes being of a parabolic cross-section, and the remaining rows of vanes being crescent shape in cross-section, substantially as and for the purposes set forth.

4. An elastic-fluid turbine, comprising, a casing, a shaft, a movable vane member on said shaft, vanes upon the opposite sides of said movable vane member, and means for conducting the elastic fluid at certain points of the casing on opposite sides of said vane member, but at other points of said cylinder admitting the elastic fluid only on one side of the vane member, substantially as and for the purposes set forth.

5. An elastic-fluid turbine, comprising, a casing, a shaft, a movable vane member on said shaft, vanes upon the opposite sides of said movable vane member, fixed vane members located on opposite sides of said movable vane member, and vanes on said fixed members extending between the vanes on the opposite sides of said movable member, the outer rows of the said fixed vane members being of a parabolic cross-section, and all other vanes being crescent-shaped in cross-section, substantially as and for the purposes set forth.

6. An elastic-fluid turbine, comprising, a casing, a shaft, a movable vane member on said shaft, vanes upon the opposite sides of said movable vane member, fixed vane members located on opposite sides of said movable vane member, vanes on said fixed members extending between the vanes on the opposite sides of said movable member, and means for conducting the elastic fluid at certain points of the casing on opposite sides of said movable member, but at other points of said cylinder admitting the elastic fluid only on one side of the vane member, substantially as and for the purposes set forth.

7. An elastic-fluid turbine, comprising, a casing, a shaft, a movable vane member on said shaft, vanes upon the opposite sides of said movable vane member, fixed vane members located on opposite sides of said movable vane member, vanes on said fixed members extending between the vanes on the opposite sides of said movable member, the outer rows of the said fixed vane members being of a parabolic cross-section, and all other vanes being crescent-shaped in cross-section, and means coöperating with said vane members for permitting the axial movement of said shaft, substantially as and for the purposes set forth.

8. An elastic-fluid turbine, comprising, a casing, a shaft, a movable vane member on said shaft, vanes upon the opposite sides of said movable vane member, fixed vane members located on opposite sides of said movable vane member, vanes on said fixed members extending between the vanes on the opposite sides of said movable member, means coöperating with said vane members for permitting an axial movement of said shaft, and means for conducting the elastic fluid at certain points of the casing on opposite sides of said movable member, but at the other points of said cylinder admitting the elastic fluid only on one side of the vane member, substantially as and for the purposes set forth.

9. In an elastic-fluid turbine, a series of movable vanes arranged in circular rows, a series of fixed vanes located in circular rows between the rows of said movable vanes, and fluid-passages between said vanes increasing in area toward the innermost row of vanes to provide for an expansion of the fluid acting upon said vanes, and the outer marginal edge portions of the movable vanes being of parabolic curvature, and the outer marginal edge portions of the fixed vanes being straight, substantially as and for the purposes set forth.

10. In an elastic-fluid turbine, a series of circular rows of movable vanes, the surface area of each vane in the outer row of vanes being less than the surface area of each vane in the innermost row of vanes, and the surface areas of the vanes in the respective intermediately-placed rows of vanes being graduated and increasing from the outer row of vanes to the innermost row of vanes, and the outer marginal edge portions of the movable vanes being of parabolic curvature, and the outer marginal edge portions of the fixed vanes being straight, substantially as and for the purposes set forth.

11. In an elastic-fluid turbine, a series of circular rows of movable vanes, the surface area of each vane in the outer row of vanes being less than the surface area of each vane in the innermost row of vanes, and the surface areas of the vanes in the respective intermediately-placed rows of vanes being graduated and increasing from the outer row of vanes to the innermost row of vanes, and a series of fixed vanes located in circular rows between the rows of movable vanes, and the surface areas of the vanes in the outer row of said fixed vanes being less than the surface areas of the vanes in the innermost row of fixed vanes, and the surface areas of the vanes in the respective intermediately-placed rows of vanes being graduated and increasing from the outer row of vanes to the innermost row of vanes, and the outer marginal edge portions of the movable vanes being of parabolic curvature, and the outer marginal edge portions of the fixed vanes being straight, substantially as and for the purposes set forth.

12. In an elastic-fluid turbine, the combination, with a casing, and a shaft, of a vane member affixed to said shaft, a stationary vane member affixed to said casing, vanes on both of said members, the said vanes on the said movable member extending toward said stationary member, and the vanes on said stationary member extending toward said movable member and providing clearance-spaces between the free ends of said vanes and the oppositely-placed members, and the outer marginal edge portions of the movable vanes being of parabolic curvature, and the outer marginal edge portions of the fixed vanes being straight, substantially as and for the purposes set forth.

13. The herein-described elastic-fluid turbine, comprising, a casing, a vertical shaft, a horizontally-arranged vane member on said shaft, and a horizontal vane member affixed to said casing, said vane members being provided with rows of vanes located within one another, a chambered fluid-receiving portion extending from the outer surface of said casing, comprising, a pair of oppositely-located chambered parts of semicircular cross-section, and a pair of oppositely-located chambered parts of quadrantal cross-section, and an inlet connected with one of said parts of semicircular cross-section, substantially as and for the purposes set forth.

14. The herein-described elastic-fluid turbine, comprising, a casing, a vertical shaft, a horizontally-arranged movable vane member on said shaft, vanes on said member arranged in circular rows on opposite sides of said member, a lower stationary vane member directly beneath said movable vane member, circular rows of vanes on said lower vane member extending in an upward direction between the downwardly-extending rows of vanes on said movable vane member, an upper stationary vane member directly above said movable vane member, and circular rows of downwardly-extending vanes and partitions on said upper vane member between which rows of vanes and partitions the rows of vanes on said movable vane member extend, the outer rows of the vanes of said fixed members being of a parabolic cross-section, and all other vanes being crescent-shaped in cross-section, substantially as and for the purposes set forth.

15. The herein-described elastic-fluid turbine, comprising, a casing, a vertical shaft, a horizontally-arranged movable vane member on said shaft, vanes on said member arranged in circular rows on opposite sides of said member, a lower stationary vane member directly beneath said movable vane member, circular rows of vanes on said lower vane member extending in an upward direction between the downwardly-extending rows of vanes on said movable vane member, an upper stationary vane member directly above said movable vane member, and circular rows of downwardly-extending vanes and partitions on said upper vane member between which rows of vanes and partitions the rows of vanes on said movable vane member extend, a chambered fluid-receiving portion extending from the outer surface of said casing, comprising, a pair of oppositely-located chambered parts of semicircular cross-section, and a pair of oppositely-located chambered parts of quadrantal cross-section, and an inlet connected with one of said parts of semicircular cross-section, substantially as and for the purposes set forth.

16. An elastic-fluid turbine, comprising, a movable vane member, and vanes on its opposite sides arranged in circular rows, a lower stationary vane member, vanes on said lower vane member also arranged in circular rows, an upper vane member, and circular rows of vanes and partitions on said upper vane member and alternately in circular alinement with each other, substantially as and for the purposes set forth.

17. An elastic-fluid turbine, comprising, a movable vane member, and vanes on its opposite sides arranged in circular rows, a lower stationary vane member, vanes on said lower vane member also arranged in circular rows, an upper vane member, and circular rows of vanes and partitions on said upper vane member and alternately in circular alinement with each other, a shroud on each row of vanes on said movable vane member, a shroud on each row of vanes on said lower vane member, and a shroud on each row of vanes on said upper vane member, substantially as and for the purposes set forth.

18. An elastic-fluid turbine, comprising, a casing, a shaft, a movable vane member, vanes on the opposite sides of said movable vane member arranged in circular rows, a lower stationary vane member, circular rows of vanes on said lower vane member extending between the rows of downwardly-projecting vanes on said movable vane member, an upper stationary vane member, circular rows of vanes and partitions on said upper vane member arranged alternately in circular alinement with each other and extending between the circular rows of upwardly-projecting vanes on said movable vane member, and means coöperating with said vane members for permitting the axial movement of said shaft and movements of said movable vane member in directions parallel with the axis of said shaft, substantially as and for the purposes set forth.

19. An elastic-fluid turbine, comprising, a casing, a shaft, a movable vane member, vanes on the opposite sides of said movable vane member arranged in circular rows, a lower stationary vane member, circular rows of vanes on said lower vane member extending between the rows of downwardly-projecting vanes on said movable vane member, an upper stationary vane member, circular rows of vanes and partitions on said upper vane member arranged alternately in circular alinement with each other and extending between the circular rows of upwardly-projecting vanes on said movable vane member, means coöperating with said vane members for permitting the axial movement of said shaft and movements of said movable vane member in directions parallel with the axis of said shaft, and means for conducting the elastic fluid on opposite sides of said movable vane member for balancing the same, substantially as and for the purposes set forth.

In testimony that we claim the invention set forth above we have hereunto set our hands this 5th day of March, 1903.

DUDLEY FARRAND.
PAUL C. OSCANYAN.

Witnesses:
FREDK. C. FRAENTZEL,
GEO. D. RICHARDS.